United States Patent
Jeon et al.

(10) Patent No.: US 11,295,729 B2
(45) Date of Patent: Apr. 5, 2022

(54) RESPONSE INFERENCE METHOD AND APPARATUS

(71) Applicant: SAMSUNG ELECTRONICS CO., LTD., Suwon-si (KR)

(72) Inventors: Jehun Jeon, Suwon-si (KR); Misuk Kim, Seoul (KR); Jeong-Hoon Park, Seoul (KR); GyuBum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 16/829,180

(22) Filed: Mar. 25, 2020

(65) Prior Publication Data

US 2021/0104231 A1 Apr. 8, 2021

(30) Foreign Application Priority Data

Oct. 2, 2019 (KR) .......................... 10-2019-0122021

(51) Int. Cl.
*G10L 15/16* (2006.01)
*G06F 17/18* (2006.01)
(Continued)

(52) U.S. Cl.
CPC .............. *G10L 15/16* (2013.01); *G06F 17/18* (2013.01); *G06N 3/04* (2013.01); *G06N 3/08* (2013.01);
(Continued)

(58) Field of Classification Search
CPC ....... G10L 15/16; G10L 15/063; G10L 15/22; G10L 19/00; G06F 17/18; G06N 3/04; G06N 3/08
See application file for complete search history.

(56) References Cited

U.S. PATENT DOCUMENTS 5,699,270 A * 12/1997 Ashe .................. G01N 33/2829
700/272
2017/0161635 A1* 6/2017 Oono .................... G06N 3/0472
(Continued)

FOREIGN PATENT DOCUMENTS

WO WO 2010/080146 A2 7/2010
WO WO 2010/080146 A3 7/2010

OTHER PUBLICATIONS

Yookoon Park et al., "A Hierarchical Latent Structure for Variational Conversation Modeling", *Department of Computer Science and Engineering & Center for Superintelligence Seoul National University*, Korea, Apr. 2018 (12 pages in English).
(Continued)

*Primary Examiner* — Michael Colucci
(74) *Attorney, Agent, or Firm* — NSIP Law

(57) ABSTRACT

A processor-implemented response inference method and apparatus are disclosed. The response inference apparatus receives an input, generates a latent variable vector in a latent variable region space by encoding the input, generates a validation vector with a predetermined phase difference from the latent variable vector, generates an output response by decoding the latent variable vector, generates a validation response by decoding the validation vector, and validates the output response by comparing the output response to the validation response.

24 Claims, 13 Drawing Sheets

(51) Int. Cl.
    *G06N 3/04*     (2006.01)
    *G06N 3/08*     (2006.01)
    *G10L 15/06*     (2013.01)
    *G10L 15/22*     (2006.01)
    *G10L 19/00*     (2013.01)

(52) U.S. Cl.
    CPC ............ *G10L 15/063* (2013.01); *G10L 15/22* (2013.01); *G10L 19/00* (2013.01)

(56) References Cited

U.S. PATENT DOCUMENTS

| | | | | |
|---|---|---|---|---|
| 2018/0218261 A1* | 8/2018 | Myara | .................. | H04W 12/12 |
| 2020/0041276 A1* | 2/2020 | Chakravarty | .......... | G01C 21/32 |
| 2020/0057947 A1 | 2/2020 | Jeon et al. | | |
| 2020/0356591 A1* | 11/2020 | Yada | ..................... | G06F 16/532 |
| 2020/0387798 A1* | 12/2020 | Hewage | ............... | G06N 3/0472 |
| 2020/0410729 A1* | 12/2020 | Zhao | ......................... | G06F 8/44 |

OTHER PUBLICATIONS

Extended European Search report dated Dec. 15, 2020 in counterpart European Patent Application No. 20181969.5 (8 pages in English).

Lopez-Martin, Manuel et al. "Conditional Variational Autoencoder for Prediction and Feature Recovery Applied to Intrusion Detection in IoT." *Sensors*, vol. 17, 2017 (pp. 1-17).

Ying, Gao et al. "An Estimation of Distribution Algorithm Utilizing Opposition-Based Learning for Nonlinear Blind Sources Separation." *American Journal of Information Science and Computer Engineering*, vol. 3, No. 5, 2017 (pp. 64-70).

Xun, Pu et al. "Developing a Novel Hybrid Biogeography-Based Optimization Algorithm for Multilayer Perceptron Training under Big Data Challenge." *Scientific Programming*, vol. 2018, 2018 (pp. 1-7 pages).

\* cited by examiner

RESPONSE INFERENCE METHOD AND APPARATUS

CROSS-REFERENCE TO RELATED APPLICATIONS

This application claims the benefit under 35 USC § 119(a) of Korean Patent Application No. 10-2019-0122021 filed on Oct. 2, 2019 in the Korean Intellectual Property Office, the entire disclosure of which is incorporated herein by reference for all purposes.

BACKGROUND

1. Field

The following description relates to a response inference method and apparatus.

2. Description of Related Art

Conversation or utterance models include a goal-oriented conversation model and an ordinary conversation model. The goal-oriented conversation model generates a single response to an utterance having a definite goal. The ordinary conversation model generates various responses to an utterance that does not have a specific goal, for example, an ordinal greeting or an expression of emotion.

Models that generate a response to a user utterance include a rule-based conversation model, a search-based conversation model, and a generation-based conversation model. In an example, the rule-based conversation model uses a preconfigured template. In an example, the search-based conversation model searches a database for an appropriate response. In an example, the generation-based conversation model generates an optimal response using pre-trained encoder and decoder.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor implemented response inference method includes receiving an input, generating a latent variable vector in a latent variable region space that includes regions corresponding to a plurality of responses by encoding the received input, generating a validation vector with a predetermined phase difference from the generated latent variable vector, generating an output response corresponding to a region of the latent variable vector by decoding the latent variable vector, generating a validation response corresponding to a region of the validation vector by decoding the validation vector, validating the output response by comparing the output response to the validation response; and outputting the output response to the received input based on a result of the validating.

The generating of the validation vector may include generating the validation vector, such that the validation vector and the latent variable vector have a predetermined phase difference.

The generating of the validation vector may include generating the validation vector, such that the validation vector and the latent variable vector are in antiphase.

The validation vector may include a plurality of validation vectors, and wherein the generating of the validation vector may include generating the validation vector, such that the validation vector and the latent variable vector have predetermined phase differences.

The latent variable vector may be a multidimensional vector that may include latent information variables to generate a response to the received input.

The generating of the latent variable vector may include generating a latent variable by encoding the received input; and generating the latent variable vector belonging to one of the regions included in the latent variable region space corresponding to the latent variable.

The generating of the latent variable vector may include sampling a plurality of vectors based on a probability distribution representing the latent variable region space; and generating the latent variable vector based on the sampled vectors.

The validating of the output response may include scoring the output response, scoring the validation response; and comparing a score of the output response to a score of the validation response.

The comparing may include determining whether a difference between the score of the output response and the score of the validation response is greater than a predetermined value.

The input may be an utterance of a user not intended to get a specific response in a conversation, and each of the plurality of responses are different responses to the utterance.

The generating of the latent variable vector may include encoding the received input with an encoder, and wherein a neural network of the encoder comprises an input layer corresponding to the received input and an output layer corresponding to a mean and a variance of a probability distribution modeling the latent variable.

The generating of the output response may include decoding the latent variable vector with a decoder, and the generating of the validation response may include decoding the validation vector with the decoder, and wherein a neural network of the decoder may include an input layer corresponding to the latent variable vector and an output layer corresponding to the output response.

A neural network of the decoder may include an input layer corresponding to the validation vector and an output layer corresponding to the validation response.

In a general aspect a processor-implemented training method includes receiving a training input, receiving a training response from among a plurality of training responses to the received training input, generating a latent variable by applying the received training input to an encoder to be trained, generating a training latent variable vector of a region included in a latent variable region space corresponding to the latent variable, generating an output response by applying the training latent variable vector to a decoder to be trained; and training a neural network of the encoder and a neural network of the decoder based on the output response and the training response to generate trained neural networks.

The method may further include generating a training validation vector with a predetermined phase difference from the training latent variable vector, generating a training validation response by applying the training validation vector to the decoder, training a discriminator configured to operate to discriminate between the output response and the training validation response; and, training the neural network of the encoder and the neural network of the decoder, such that the discriminator is unable to discriminate between the output response and the training validation response.

The training latent variable vector may be a multidimensional vector comprising latent information variables to generate a response to the training input.

The latent variable region space may include a plurality of regions corresponding to the plurality of training responses.

The generating of the training latent variable vector may include sampling a plurality of vectors based on a probability distribution representing the latent variable region space, generating an embedded control input by randomizing a control input, applying the embedded control input to the sampled vectors; and, generating the training latent variable vector through a weighted sum of the sampled vectors to which the embedded control input is applied.

In a general aspect, a response inference apparatus includes a processor configured to receive an input, generate a latent variable vector in a latent variable region space that includes regions corresponding to a plurality of responses by encoding the received input, generate a validation vector with a predetermined phase difference from the generated latent variable vector, generate an output response corresponding to a region of the latent variable vector by decoding the latent variable vector, generate a validation response corresponding to a region of the validation vector by decoding the validation vector, validate the output response by comparing the output response to the validation response; and output the output response to the received input based on a result of the validating.

The apparatus may further include a memory including instructions, wherein, in response to the instructions being executed by the processor, the processor is controlled to perform the receiving of the input, the generating of the latent variable vector in the latent variable region space, the generating of the validation vector, the generating of the output response, the generating of the validation response, the validating of the output response, and the outputting of the output response.

In a general aspect, a processor-implemented response inference method includes receiving a user input, generating a probability distribution with an encoder based on the received input, sampling a plurality of vectors based on the generated probability distribution, applying an embedded control input to each of the sampled vectors, generating a latent variable vector from the probability distribution based on the control input; and generating an output response corresponding to a region of the latent variable vector by decoding the latent variable vector.

The control input may be a vector of a same dimension as dimensions of the sampled vectors.

The probability distribution may be generated from a mean and a variance generated from the user input.

Other features and aspects will be apparent from the following detailed description, the drawings, and the claims.

Figure 1:
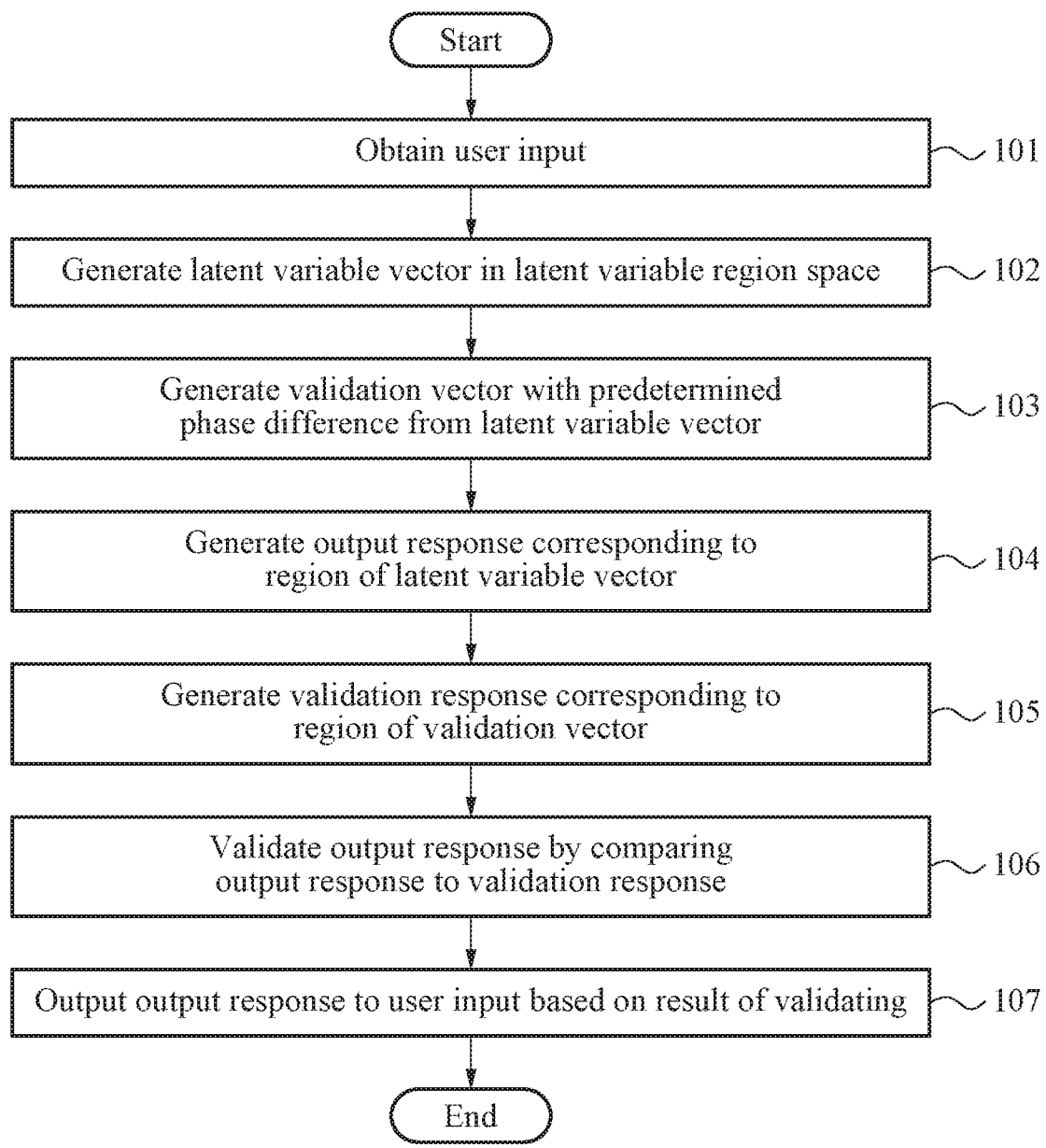
FIG. 1 illustrates an example of a response inference method, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The terminology used herein is for describing various examples only, and is not to be used to limit the disclosure. The articles "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The examples set forth hereinafter relate to a technique of generating a response using a generation-based conversation model. Rule or search-based conversation models may have difficulties in recognizing various inputs and are restricted to generate a response within expressions in a database, whereas the generation-based conversation model recognizes various inputs through training. A general generation-based conversation model generates an optimal response based on training and thus, in some examples, may have limitations in generating various responses to the same input. However, the generation-based conversation model disclosed herein provides a technology of generating various responses to the same input.

Hereinafter, examples will be described in detail with reference to the accompanying drawings. In the drawings, like reference numerals are used for like elements.

FIG. 1 illustrates an example of a response inference method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that performs the specified functions, or combinations of special purpose hardware and computer instructions.

Referring to FIG. 1, in operation 101, a response inference apparatus obtains an input from a user. The input may be an utterance, such as a user's natural language utterance. In an example, the response inference apparatus is an apparatus that infers a response to an input from a user. In an example, the response inference apparatus is implemented on a hardware component as described below. The user input includes information that enables generation of a response to the user input, such as, for example, a user utterance. For example, the user input includes a multidimensional vector suitable to be processed by the response inference apparatus.

Figure 2A:
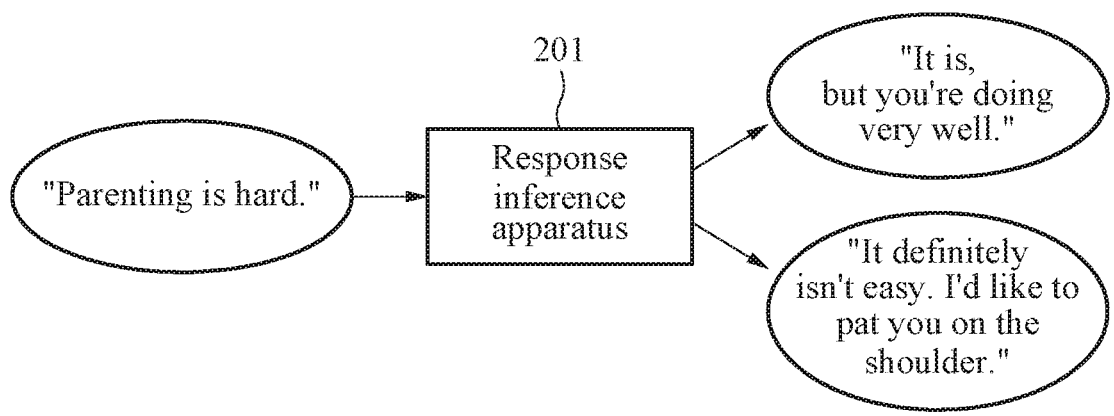
FIGS. 2A and 2B illustrate examples of a response inference method, in accordance with one or more embodiments.
Figure 2B:
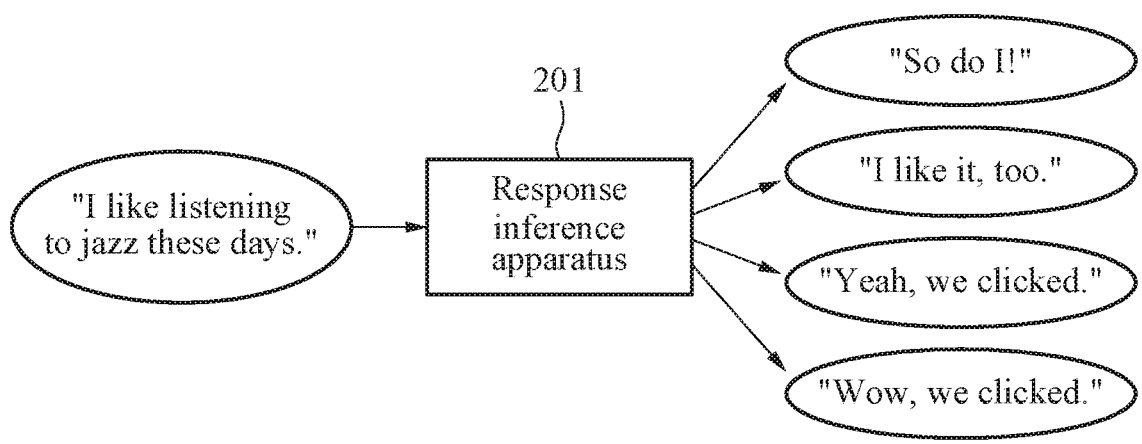

Referring to FIGS. 2A and 2B, a response inference apparatus 201 may generate a plurality of responses to the same user input. For example, in response to the user input of "Parenting is hard", a first response of "It is, but you're doing very well" may be generated at a first point in time, and a second response of "It definitely isn't easy. I'd like to pat you on the shoulder" may be generated at a second point in time. Thus, a user may feel liveness, rather than boredom, in the automatically generated responses, which may be personalized in nature. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1 again, in operation 102, the response inference apparatus generates a latent variable vector in a latent variable region space including regions corresponding to a plurality of responses by encoding the user input. As described further below, the response inference apparatus generates the latent variable region space corresponding to the user input, and generates a different response for each region of the partitioned latent variable region space.

In an example, the response inference apparatus encodes the user input using an encoder. In an example, the encoder is a type of neural network and generates a latent variable by converting a dimension of the user input. For example, the encoder may be trained to generate the latent variable from the user input, and the trained encoder may generate the latent variable from the user input. In an example, the latent variable is modeled by a probability distribution. For example, the latent variable is represented as the latent variable region space through the probability distribution including a mean and a variance.

In an example, the latent variable region space is a space representing the latent variable that is generated by the encoder and includes the regions corresponding to the plurality of responses by training the encoder and the decoder. The latent variable region space is partitioned by control inputs corresponding to the plurality of responses. In an example, the control inputs are information inducing the generation of a latent variable vector in a region of the latent variable region space. The control inputs are vectors of a dimension that is the same as the dimension of the generated vector. An operation of partitioning the latent variable region space using the control inputs during a training process will be further described below.

Hereinafter, for ease of description, examples of partitioning a latent variable region space into regions corresponding to a plurality of responses included in the latent variable region space will be described. However, examples are not limited thereto. In some examples, the regions corresponding to the plurality of responses may not cover the entire latent variable region space. In addition, examples in which regions corresponding to a plurality of responses included in a latent variable region space are included in the latent variable region space will be described further with reference to FIGS. 3A through 10.

The response inference apparatus generates the latent variable vector from the user input. The latent variable vector is a vector indicating a position within the latent variable domain space and belongs to any one of the regions. The response inference apparatus generates a latent variable vector belonging to one of the partitioned regions of the latent variable region space based on the probability distribution.

The latent variable vector is a multidimensional vector containing latent information variables to generate a response corresponding to the user input. As shown in the examples of FIGS. 2A and 2B, the user input is a user utterance that is not intended to obtain a specific answer in an ordinary conversation, and the response to the user input is a response to the user utterance.

Referring again to FIG. 1, in operation 103, the response inference apparatus generates a validation vector with a predetermined phase difference from the latent variable vector. The validation vector indicates a position in the latent variable region space, similar to the latent variable vector. The response inference apparatus generates the validation vector, such that the validation vector and the latent variable vector have the predetermined phase difference. The response inference apparatus generates the validation vector, such that the validation vector and the latent variable vector are in antiphase.

The validation vector may include a plurality of validation vectors. In this example, the response inference apparatus generates the validation vectors, such that the validation vectors and the latent variable vector have predetermined phase differences. In an example, in a set of vectors including the plurality of validation vectors and the latent variable vector, a phase difference between closest vectors is constant. In another example, phase differences between the plurality of validation vectors and the latent variable vector are determined at random.

Referring again to FIG. 1, in operation 104, the response inference apparatus generates an output response corresponding to the region to which the latent variable vector belongs by decoding the latent variable vector. Since the latent variable region space is partitioned into regions corresponding to various responses, the response inference apparatus infers various responses from the user input. The response inference apparatus uses the encoder and decoder implemented by trained neural networks, and thus, recognizes various user inputs and generates various responses suitable for, or pertinent to, the recognized user inputs.

Referring again to FIG. 1, in operation 105, the response inference apparatus generates a validation response corresponding to a region of the validation vector by decoding the validation vector. In relation to the generated validation response and the generated output response, the response inference apparatus validates the output response by comparing the output response to the validation response, in operation 106. In detail, the response inference apparatus scores the output response and the validation response, and compares a score of the output response to a score of the validation response. For example, the response inference apparatus compares a reliability of the output response to a reliability of the validation response.

In an example, the response inference apparatus validates the output response by determining whether a difference between the score of the output response and the score of the validation response is greater than a predetermined value. For example, in response to a difference between the reliability of the output response and the reliability of the validation response being greater than a threshold value, the response inference apparatus determines that validation of the output response is failed. In response to the difference being less than the threshold value, the response inference apparatus determines that validation of the output response is successful. An example in which the response inference apparatus validates the output response will be described further with reference to FIG. 7.

Referring again to FIG. 1, in operation 107, the response inference apparatus outputs the output response to the user input based on a result of the validating. An example in which the response inference apparatus outputs the output response based on a result of the validating will be described further with reference to FIG. 7.

The response inference apparatus performs a response inference method, thereby validating an utterance generated through deep neural network-based natural language generation. Further, the response inference apparatus performs the response inference method, whereby the performance of the response inference apparatus improves, which will be described further below.

Figure 3A:
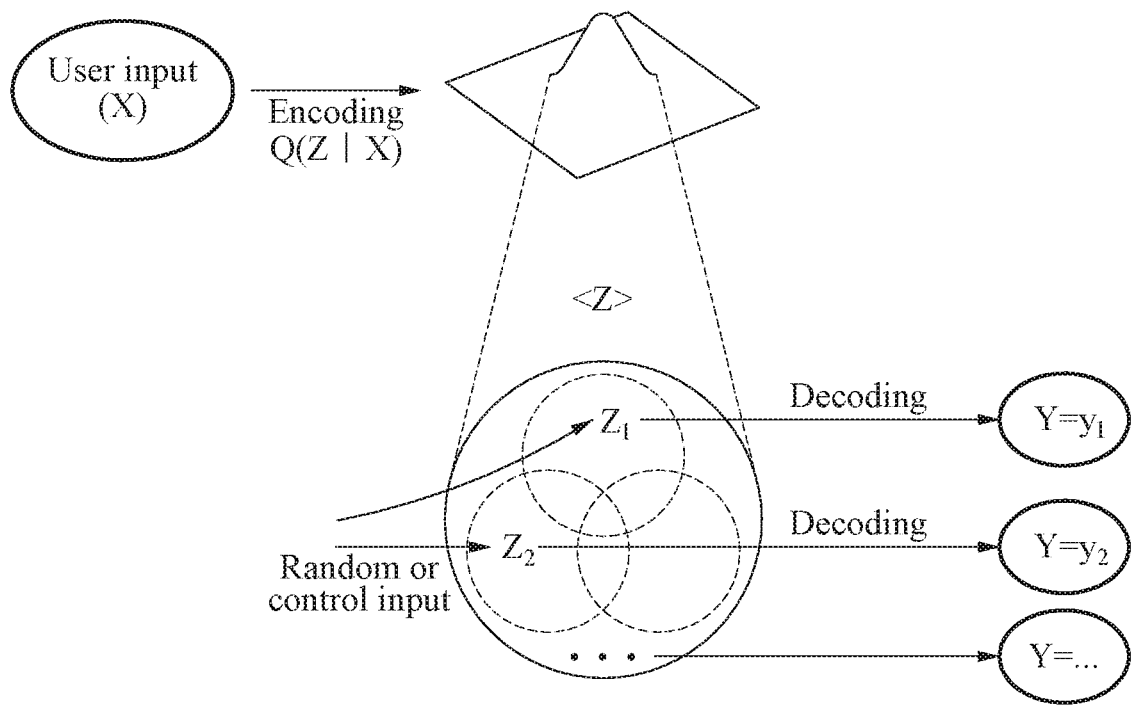
FIGS. 3A and 3B illustrate examples of a response inference method, in accordance with one or more embodiments.
Figure 3B:
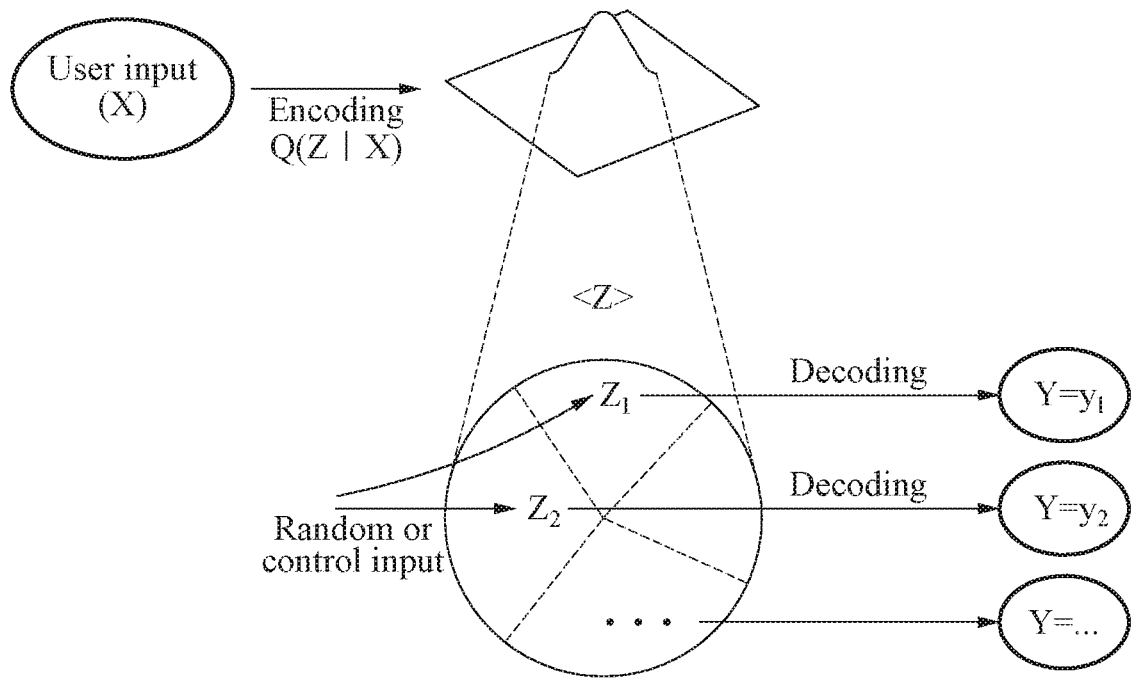

FIGS. 3A and 3B illustrate examples of a response inference method, in accordance with one or more embodiments.

Referring to FIGS. 3A and 3B, a response inference apparatus generates a probability distribution $Q(Z|X)$ that models a latent variable by encoding a user input (X). A latent variable region space <Z> corresponding to a latent variable Z is represented through the probability distribution.

In FIG. 3A, the latent variable region space <Z> includes control inputs corresponding to various responses. In FIG. 3B, the latent variable region space <Z> is partitioned by control inputs corresponding to various responses. The response inference apparatus generates a latent variable vector z from the probability distribution $Q(Z|X)$. In an example, the response inference apparatus generates the latent variable vector z randomly from the probability distribution. In an example, the response inference apparatus generates the latent variable vector z using the control inputs.

The example in which the latent variable region space <Z> includes control inputs corresponding to various responses as in the example of FIG. 3A may include an example of using a conditional variational autoencoder (CVAE) model.

In an example, the latent variable vector z may belong to any one of the regions included in the latent variable region space <Z> or partitioned within the latent variable region space <Z>. In an example, the response inference apparatus decodes the latent variable vector z to generate an output response $P(Y=y\_i|Z=z\_i)$. For example, the response inference apparatus generates an output response $y_1$ corresponding to a region to which a randomly generated latent variable vector $z_1$ belongs, by decoding the latent variable vector $z_1$.

In an example, the response inference apparatus generates the latent variable vector z from the probability distribution $Q(Z|X)$ using the control inputs. The response inference apparatus obtains a control input corresponding to a region in the latent variable region space <Z> or a set response, and induces the generation of the latent variable vector z corresponding to the region using the obtained control input. For example, the response inference apparatus selects one of the control inputs corresponding to the plurality of responses and induces generation of the latent variable vector z corresponding to the selected control input. The response inference apparatus generates the output response by decoding the generated latent variable vector z. As described above, the response inference apparatus infers a response by implementing an encoder and a decoder. Hereinafter, operations performed with the encoder and the decoder will be described with reference to FIGS. 4A and 4B.

Figure 4A:
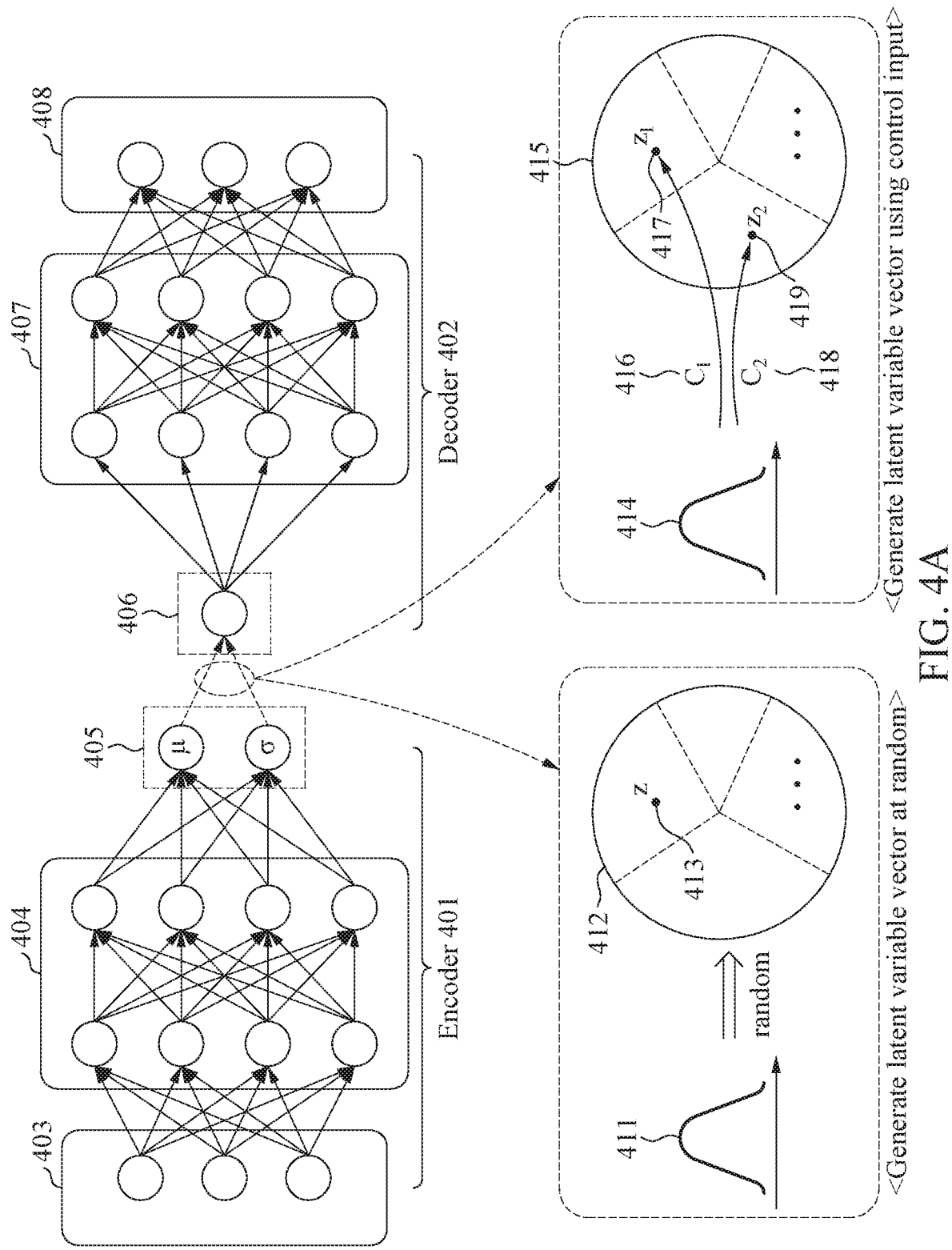
FIGS. 4A and 4B illustrate examples of operations performed using an encoder and a decoder, in accordance with one or more embodiments.
Figure 4B:
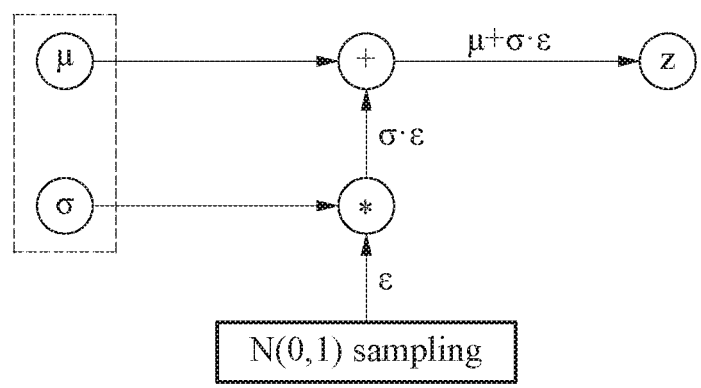

FIGS. 4A and 4B illustrate an example of operations performed with an encoder and a decoder, in accordance with one or more embodiments.

Referring to FIG. 4A, a response inference apparatus generates an output response from a user input by implementing an encoder 401 and a decoder 402. The encoder 401 and the decoder 402 are trained in advance to perform encoding and decoding based on a latent variable region space that is partitioned into a plurality of regions. The encoder 401 and the decoder 402 may be trained to generate different output responses for the partitioned regions of the latent variable region space. The latent variable region space is partitioned into a number of regions by control inputs during a training process.

The generation of the output response based on the user input may be implemented through processor implemented neural network models, as specialized computational architectures which, after substantial training, may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

In an example, a neural network of the encoder 401 includes an input layer 403 corresponding to the user input, a hidden layer 404, and an output layer 405 corresponding to a mean and a variance of a probability distribution modeling a latent variable. A neural network of the decoder 402 includes an input layer 406 corresponding to a latent variable vector, a hidden layer 407, and an output layer 408 corresponding to an output response. In an example, the input layer 406 in the neural network of the decoder 402 corresponds to a validation vector, and the output layer 408 in the neural network of the decoder 402 corresponds to a validation response, although not shown in the drawings.

The neural network may be configured to perform, as non-limiting examples, voice recognition, language recognition, and speech recognition by mutually mapping input data or user utterances, and output data in a nonlinear relationship based on deep learning. Such deep learning is indicative of processor implemented machine learning schemes for solving issues, such as issues related to speech recognition from a big data set, as non-limiting examples. The deep learning may be implemented by the mapping of input data and the output data through supervised or unsupervised learning or training, such that when trained the resultant machine learning model, engine, or example neural network may intuitively map further input data to output data with a desired accuracy or reliability.

The above structures of the neural networks are provided as an example only. Aspects of nodes, connection structures, and parameters in layers can be variously modified to improve the efficiency and performance of training or inference.

As discussed above, in an example, the neural network of the encoder 401 and the neural network of the decoder 402 may have an architecture of a deep neural network (DNN) or an architecture of an n-layer neural network. The DNN or the n-layer neural network may correspond to a convolutional neural network (CNN), a recurrent neural network (RNN), a deep belief network, a fully connected network, a bi-directional neural network, restricted Boltzman machines, or may include different or overlapping neural network portions respectively with full, convolutional, recurrent, and/or bi-directional connections. For example, the neural network of the encoder 401 and the decoder 402 may be implemented as the CNN. However, the neural network of the encoder 401 and the decoder 402 is not limited thereto. The CNN, which is an example of the encoder 401 and the decoder 402, may include a sub-sampling layer, a pooling layer, a fully connected layer, etc., in addition to a convolution layer.

The neural networks may be implemented as an architecture having a plurality of layers including input layers 403 and 406, feature maps, and output layers 405 and 408. In the neural network, a convolution operation between the input and a filter referred to as a kernel, is performed, and as a result of the convolution operation, the feature maps are output.

In an example, the feature maps that are output are input feature maps, and a convolution operation between the output feature maps and the kernel is performed again, and as a result, new feature maps are output. Based on such repeatedly performed convolution operations, ultimately, an output response corresponding to the region to which the latent variable vector 419 belongs is output.

The response inference apparatus generates a probability distribution 411 based on the mean and the variance generated from the user input using the encoder 401. As described above, the response inference apparatus generates a latent variable vector 413 belonging to one of the regions of a latent variable region space 412 at random from the probability distribution 411, and generates an output response corresponding to the region to which the latent variable vector 413 belongs using the decoder 402.

The response inference apparatus may induce the generation of a latent variable vector in a desired region using a control input. For example, the response inference apparatus generates a latent variable vector 417 belonging to a first region of a latent variable region space 415 from a probability distribution 414 using a control input 416, and generates an output response corresponding to the region to which the latent variable vector 417 belongs using the decoder 402. The response inference apparatus generates a latent variable vector 419 belonging to a second region among regions of the latent variable region space 415 from the probability distribution 414 using a control input 418 and generates an output response corresponding to the region to which the latent variable vector 419 belongs using the decoder 402.

Referring to FIG. 4B, an example of implementing an operation of generating a latent variable vector from the output layer 405 of the encoder 401 is illustrated. The response inference apparatus transforms a latent variable vector sampled from a normal distribution N with a mean of "0" and a variance of "1", thereby generating a latent variable vector z sampled from a probability distribution Z corresponding to a mean $\mu$ and a variance $\sigma$ of the output layer 405. For example, the response inference apparatus generates the latent variable vector z by sampling $\varepsilon$ from the normal distribution N and calculating $\mu+\sigma\cdot\varepsilon$ from $\varepsilon$.

In an example, the neural network of the encoder 401 and the neural network of the decoder 402 are configured to process audio data in voice entry or user utterance to extract information about the voice entry for voice recognition, providing a response, or speech-to-text translation of the voice entry. For example, the neural network performs convolution with respect to one or more input feature maps corresponding to the voice entry to generate an output feature map. The neural network apparatus generates a response to the voice recognition output or a response as a text translation output based on information in the output feature map. That is, the neural network of the encoder 401 and the neural network of the decoder 402 may indicate the result of the speech recognition, or speech-to-text translation, either explicitly or implicitly, as a response. For example, the response to the recognized speech may be explicitly indicated through display in text form on a display of the response inference apparatus or audibly fed back to the user, or another user, or implicit indications may be provided through additional operations, or selective non-operations, of the response inference apparatus based on the result of the speech recognition. In comparison with typical neural network apparatuses, the neural network apparatus of the encoder 401 and the neural network apparatus of the decoder 402 may quickly and efficiently process a convolution operation in a neural network to provide a response to a voice prompt. Thus, making optimal use of available hardware resources for performing convolutions.

Figure 5A:
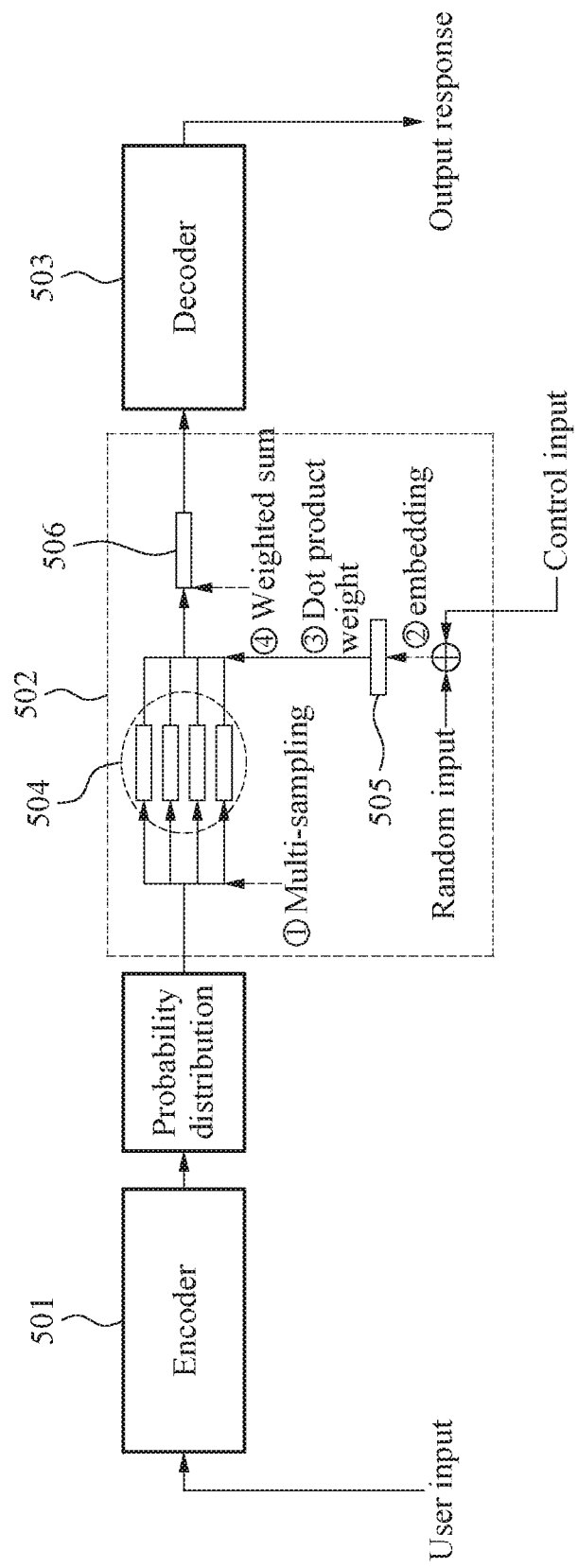
FIGS. 5A and 5B illustrate examples of generating a latent variable vector through multi-sampling, in accordance with one or more embodiments.
Figure 5B:
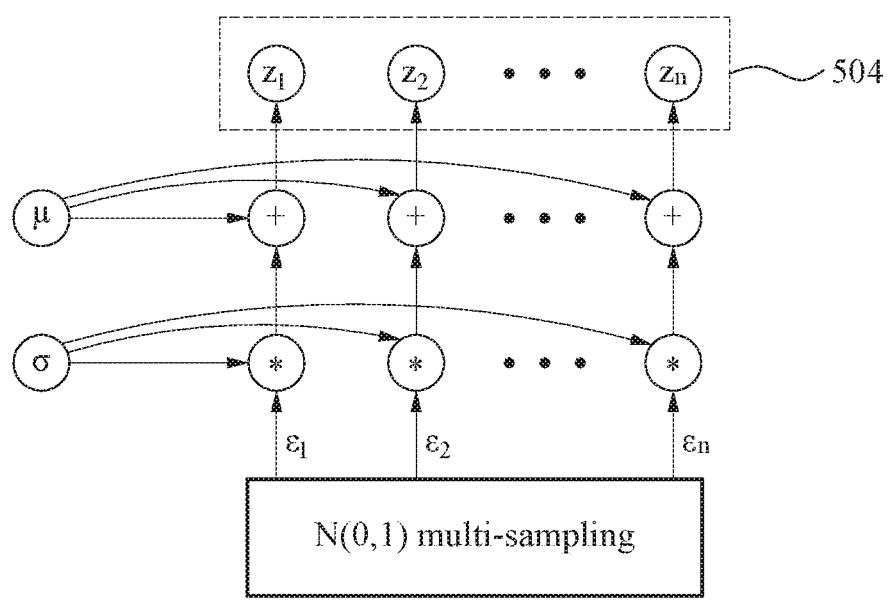

FIGS. 5A and 5B illustrate an example of generating a latent variable vector through multi-sampling, in accordance with one or more embodiments.

Referring to FIG. 5A, a response inference apparatus includes a component 502 configured to generate a latent variable vector 506 that is applied to a decoder 503 from a probability distribution, for example, a mean and a variance, generated with an encoder 501. The response inference apparatus samples a plurality of vectors 504 based on the probability distribution generated by the encoder 501. In an example, the response inference apparatus samples the plurality of vectors 504 at random from the probability distribution. In an example, the plurality of vectors 504 may include multidimensional variables.

In an example, the response inference apparatus may use the embedded control input 505 to generate the latent variable vector 506 that randomly selects any one of the plurality of responses. For example, the embedded control input 505 may be a vector of a dimension that is the same as dimensions of the sampled vectors 504 and is determined at random.

The response inference apparatus applies the embedded control input 505 to each of the sampled vectors 504. The response inference apparatus calculates a similarity by performing a dot product operation between the control input 505 and each of the sampled vectors 504.

In an example, the response inference apparatus generates the latent variable vector 506 by implementing a similarity-based weighted sum of the sampled vectors to which the embedded control input 505 is applied. For example, a result of the dot product operation between the vectors may have a relatively greater value as directions of the vectors become more similar relative to each other. Thus, in an example, the response inference apparatus generates the latent variable vector 506 by summing up results of the dot product operation between the control input 505 and each of the sampled vectors 504. In another example, the response inference apparatus generates the latent variable vector 506 by summing up the sampled vectors 504 using a SoftMax value of results of the dot product operation between the control input 505 and each of the sampled vectors 504 as a weight.

As described above, the latent variable vector 506 is a multidimensional vector representing latent variables to infer a response, and the sampled vectors 504 and the control input 505 are vectors of the same dimension. Thus, in an example, the latent variable vector 506 is also generated in a dimension that is the same as the dimensions of the sampled vectors 504 and the control input 505. The response inference apparatus generates an output response from the latent variable vector 506 with the decoder 503.

In this example, as described with reference to FIGS. 2A and 2B, one of various responses to the same user input is selected at random and output.

The response inference apparatus induces a desired response based on a control input. The control input is a vector of a dimension that is the same as dimensions of the sampled vectors 504. To induce a particular response among the various responses, the response inference apparatus selects one control input from a plurality of control inputs. As described above, the control input is a vector that biases a latent variable vector to a region among regions into which a latent variable region space is partitioned.

In an example, the response inference apparatus randomizes the control input. For example, the response inference apparatus generates the embedded control input 505 by applying a random input to the control input.

The response inference apparatus generates output responses from a user input using control inputs corresponding to keywords, as shown in Table 1 below.

TABLE 1

| User input | Keyword | Output response |
|---|---|---|
| I have to spend holidays alone. | Movie | Not bad. How about watching VOD movies you wanted to watch? |
| | Book | It would be a relaxed vacation! How about reading books you've bought but never read? |

The response inference apparatus generates output responses from a user input using control inputs corresponding to sentiments, as shown in Table 2 below.

TABLE 2

| User input | Sentiment | Output response |
|---|---|---|
| I like listening to jazz these days. | Positive | So do I. |
| | Negative | I'm interested in classical music more. |

In addition to the above examples, the control inputs may be set based on attitudes and directive or user guidance, and various schemes may be adopted and applied depending on a design intent, as indicated in Tables 3 and 4 below.

TABLE 3

| User input | Attitude | Output response |
|---|---|---|
| I really don't want to work today! | Lazy | Stop doing what you don't want to do, and how about drinking a bottle of cold beer? |
| | Diligent | It must be very hard, but you'd better finish it. Cheer up! |

TABLE 4

| User input | Directive | Output response |
|---|---|---|
| Give me some information of investment. | Aggressive investment | Hedge funds are recommended. |
| | Positive investment | Index funds are recommended. |
| | Risk neutral investment | Balanced funds are recommended. |
| | Safety-pursuing investment | Bond funds are recommended. |
| | Safe investment | Savings are recommended. |

The control inputs used in the example of FIG. 5A are the same as control inputs used for a training process, which will be described later.

Referring to FIG. 5B, an example of implementing a multi-sampling operation is illustrated. The response inference apparatus transforms latent variable vectors multi-sampled from a normal distribution N with a mean of "0" and a variance of "1", thereby generating latent variable vectors $z_i$ sampled from a probability distribution Z corresponding to a mean $\mu$ and a variance $\sigma$. For example, the response inference apparatus generates the latent variable vectors $z_i$ 504 by multi-sampling $\varepsilon_i$ from the normal distribution N and calculating $\mu+\sigma \cdot \varepsilon_i$ from $\varepsilon_i$.

In an example, the encoder 501 and the decoder 503 are trained concurrently by implementing an operation of multi-sampling the latent variable vectors between the encoder 501 and the decoder 503 with nodes of neural networks, which will be described later. Through this, examples may be implemented using an end-to-end neural network.

Figure 6:
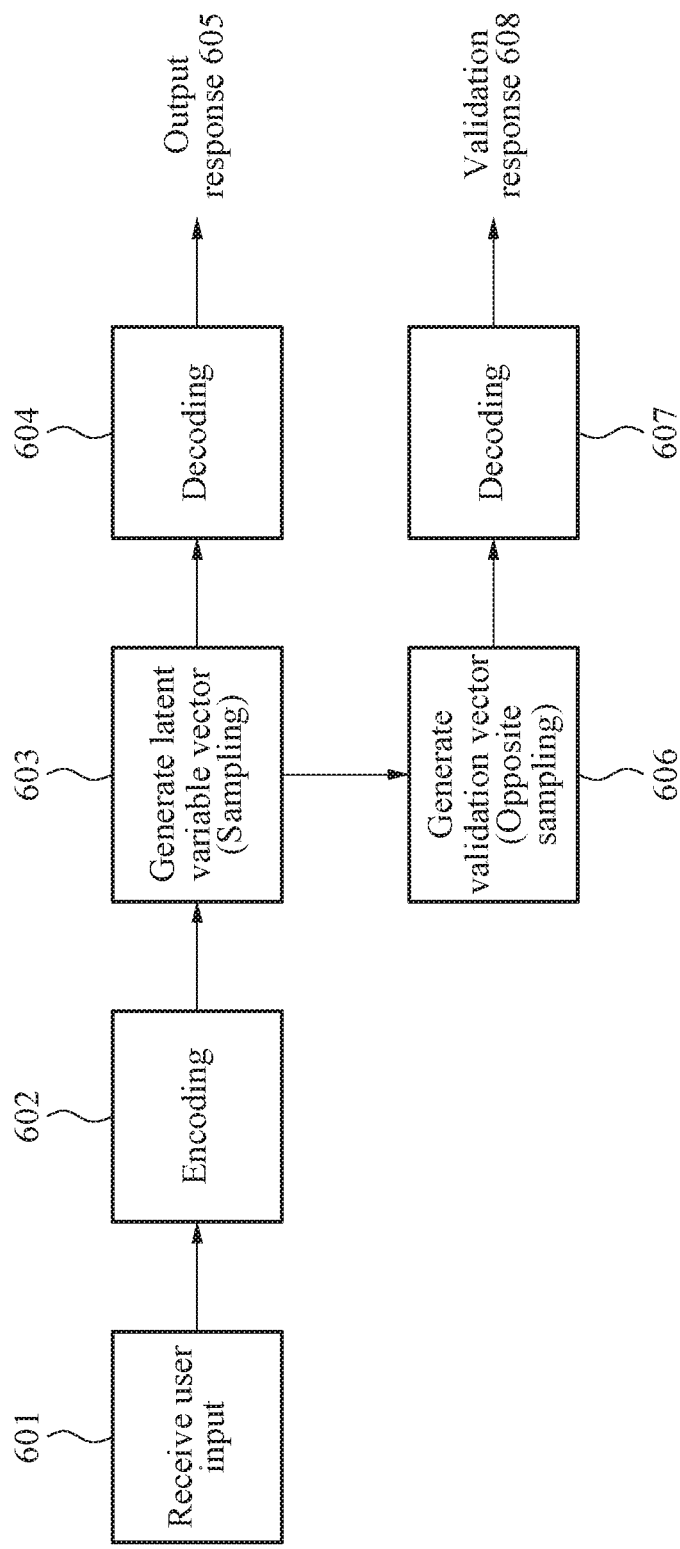
FIG. 6 illustrates an example of generating an output response and a validation response, in accordance with one or more embodiments.

FIG. 6 illustrates an example of generating an output response and a validation response in accordance with one or more embodiments.

Referring to FIG. 6, in operation 601, a response inference apparatus obtains a user input. The response inference apparatus encodes the obtained user input in operation 602, and thereby generates a latent variable vector in operation 603. In an example, the response inference apparatus samples a plurality of vectors based on a probability distribution representing a latent variable region space, and generates the latent variable vector based on the sampled vectors. The response inference apparatus decodes the latent variable vector in operation 604 and thereby generates an output response in operation 605.

In operation 606, the response inference apparatus generates a validation vector through additional sampling. In an example, the validation vector is generated such that the validation vector and the latent variable vector are in anti-phase. In another example, the validation vector is generated such that the validation vector and the latent variable vector have a predetermined phase difference. In still another example, the validation vector is generated such that the validation vector and the latent variable vector have a random phase difference. The response inference apparatus decodes the validation vector in operation 607 and thereby generates a validation response in operation 608. The decoding of operation 604 and the decoding of operation 607 may be performed by the same decoder. In an example, the decoding of operation 604 and the decoding of operation 607 may be performed by separate decoders.

The response inference apparatus validates the output response generated in operation 605 based on the validation response generated in operation 608. Examples of validating the output response will be described further with reference to FIG. 7.

In an example, a plurality of validation vectors may be additionally sampled. In this example, the response inference apparatus generates a plurality of validation responses by decoding the plurality of validation vectors. The response inference apparatus may validate the output response based on at least one of the plurality of validation responses. For example, the response inference apparatus may select a validation response most similar to the output response from among the plurality of validation responses, and validate the output response based on the selected validation response.

Figure 7:
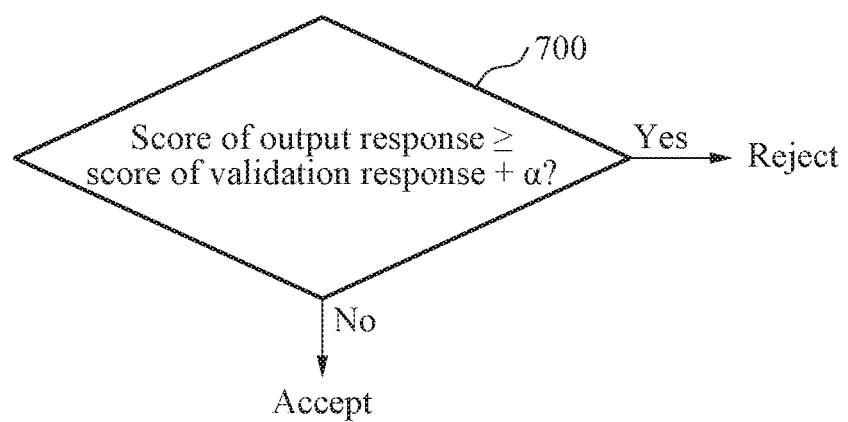
FIG. 7 illustrates an example of comparing an output response to a validation response, in accordance with one or more embodiments.

FIG. 7 illustrates an example of comparing an output response to a validation response.

Referring to FIG. 7, a response inference apparatus applies scores to an output response and a validation response in order to compare the output response to the validation response. In operation 700, the response inference apparatus validates the output response by determining whether a difference between a score of the output response and a score of the validation response is greater than or equal to a predetermined value a.

In an example, the score of the output response and the score of the validation response may correspond to likelihood scores. A likelihood score is determined in view of a correlation between a plurality of words constituting a response to be scored. The likelihood score reflects the naturalness of a sentence and a consistency of the meaning of the sentence.

Based on a result of the validating, the response inference apparatus outputs the output response to a user input. In response to the difference between the score of the output response and the score of the validation response being less than the predetermined value a, the response inference apparatus outputs the output response.

In response to the difference between the score of the output response and the score of the validation response being greater than the predetermined value a, the response inference apparatus does not output the output response. The response inference apparatus may search for a new response candidate by performing sampling again, and validates the newly found response candidate by performing additional sampling again.

In another example, the response inference apparatus may receive another user input. For example, the response inference apparatus may provide a user with a guide to induce an input again.

Figure 8:
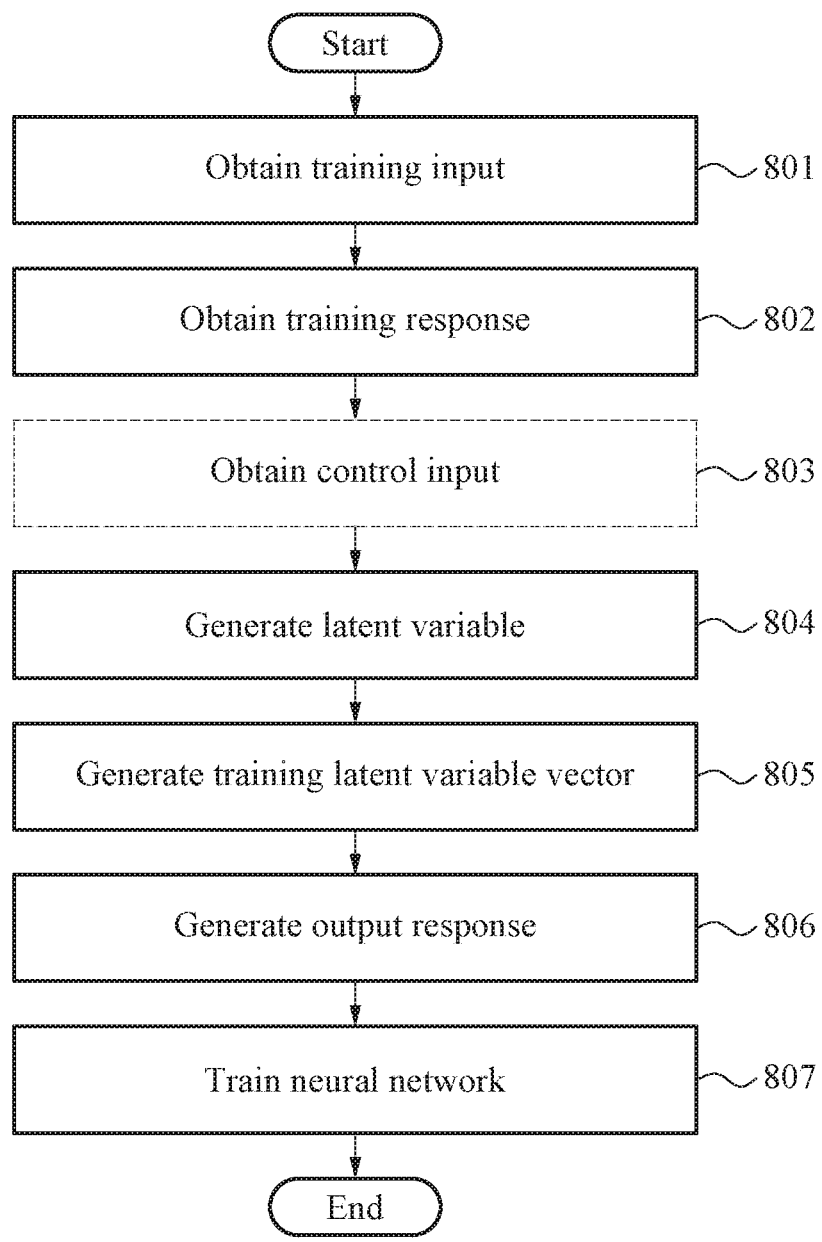
FIG. 8 illustrates an example of a training method for response inference, in accordance with one or more embodiments.

FIG. 8 illustrates an example of a training method for response inference in accordance with one or more embodiments. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 801, a training apparatus for response inference, hereinafter, the training apparatus, obtains a training input. The training apparatus is an apparatus for training an encoder and/or a decoder to infer a response and may be implemented on a hardware component.

In operation 802, the training apparatus obtains one of a plurality of training responses to the training input. The training responses are responses suitable for the training input and correspond to ground truths.

In operation 803, the training apparatus obtains a control input corresponding to the obtained training response among control inputs corresponding to the plurality of training responses. For example, training responses to a training input of "I like listening to jazz these days" may include, but are not limited to, "So do I!", "I like it, too", and "Yeah, we clicked", and control inputs correspond to the training responses, respectively.

In an example, the control inputs are feature vectors generated by encoding the training responses. Referring to the example of FIG. 2B, a first control input is generated by encoding "So do I!", a second control input is generated by encoding "I like it, too", a third control input is generated by encoding "Yeah, we clicked", and a fourth control input is generated by encoding "Wow, we clicked" The first through fourth control inputs are multidimensional vectors indicating different positions in a multidimensional space.

When a latent variable region space is determined based on the user input, the latent variable region space is partitioned into regions using various control inputs corresponding to various responses. In this example, the neural networks are trained to output a response corresponding to each partitioned region. Further, the training apparatus generates embedded control inputs by adding a random input to the control inputs and partitions the latent variable region space using the embedded control inputs, thereby increasing a proportion of each region in the latent variable region space.

In another example, the control inputs are feature vectors generated by encoding information such as keywords or sentiments as shown in Table 1 and Table 2 above. For example, referring to Table 1, a first control input is generated by encoding a keyword of "movie", and a second control input is generated by encoding a keyword of "book".

In an example, the training apparatus selects a control input corresponding to a training response to be used for training from among the control inputs.

In operation 804, the training apparatus generates a latent variable by applying the training input to an encoder to be trained. As described above, a probability distribution is one way of representing a latent variable region space corresponding to a latent variable, and the encoder is designed to output a mean and a variance.

In operation 805, the training apparatus generates a training latent variable vector of a region included in the latent variable region space based on the probability distribution and the obtained control input. In an example, the training apparatus generates the training latent variable vector of the region corresponding to the obtained control input in the latent variable region space. As described above, the control input induces generation of a latent variable vector in a region of the latent variable region space, and thus the training apparatus generates the training latent variable vector corresponding to the control input.

In operation 806, the training apparatus generates an output response by applying the training latent variable vector to a decoder to be trained. As described above, the decoder is designed to output a response from the latent variable vector.

In operation 807, the training apparatus trains the neural networks of the encoder and the decoder based on the output response and the training response. The neural networks are trained using various schemes. The training apparatus optimizes the neural networks of the encoder and the decoder and partitions the latent variable region space such that different output responses are generated for regions corresponding to the control inputs. A response inference apparatus generates various output responses using the latent variable region space partitioned by training.

Figure 9:
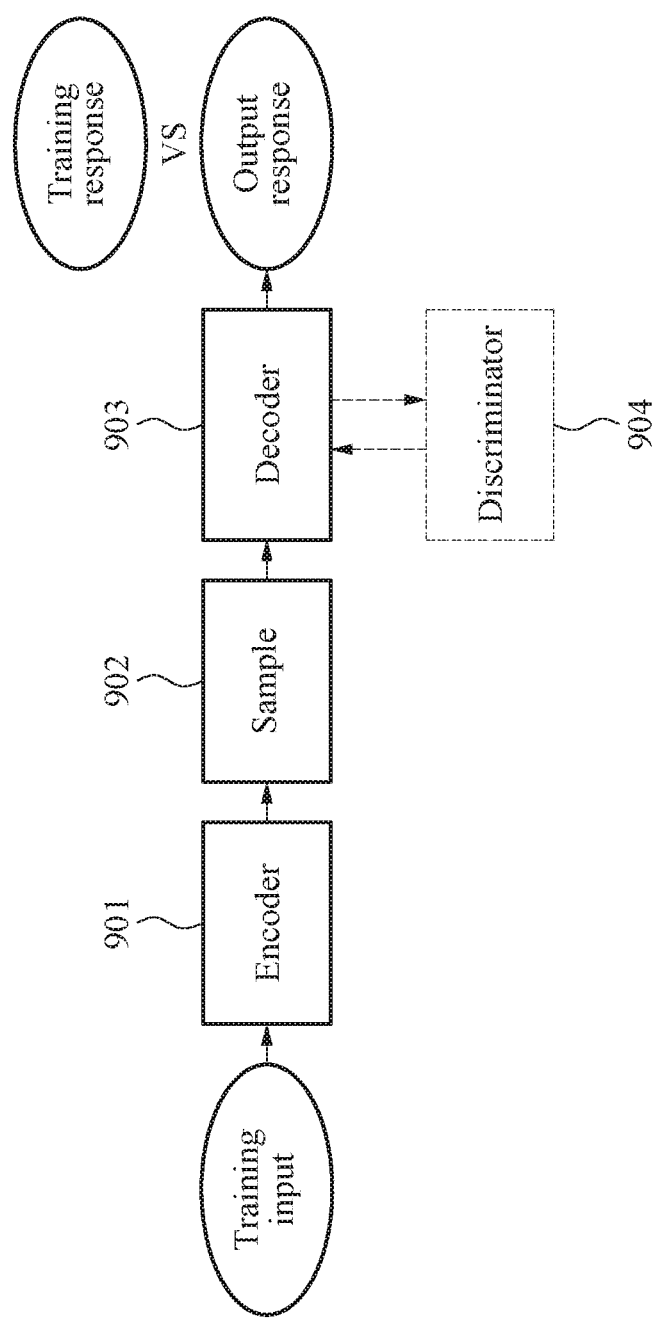
FIG. 9 illustrates an example of a training method for response inference, in accordance with one or more embodiments.

FIG. 9 illustrates an example of a training method for response inference in accordance with one or more embodiments.

Referring to FIG. 9, a training apparatus applies a training input to an encoder 901, and applies an encoding vector output from the encoder 901 to a sampler 902. The sampler 902 is implemented to perform operation 603 and operation 606 of FIG. 6.

A decoder 903 generates an output response or a training validation response based on an output from the sampler 902. For example, if a training latent variable vector is generated by the sampler 902 in operation 603, the decoder 903 generates the output response. If a training validation vector is generated by the sampler 902 in operation 606, the decoder 903 generates the training validation response.

A discriminator 904 and the decoder 903 may operate competitively. The decoder 903 generates data as similar as possible to real data, and the discriminator 904 discriminates between real data and data that is not real data, hereinafter, fake data. In an example, the real data corresponds to the output of the decoder 903 generated in operation 603, and the fake data corresponds to the output of the decoder 903 generated in operation 606.

In an example, training is performed as follows for the competitive operation between the discriminator 904 and the decoder 903. The training apparatus trains the decoder 903 and/or the encoder 901 using back-propagation learning. The training apparatus simultaneously trains the encoder 901 and the decoder 903, thereby generating an end-to-end response inference engine.

For example, if the output response is generated by the decoder 903, the training apparatus trains the discriminator 904 to generate an output corresponding to real data. Further, the training apparatus trains the decoder 903 and/or the encoder 901 based on a loss function, for example, a reconstruction loss, defined as a difference between the output response and a training response corresponding to a ground truth. The loss function represents a difference between a class of input data x and a class recognized using a mapping function $f_t(x)$ as an error. The neural network is trained by minimizing the loss function.

If the training validation response is generated by the decoder 903, the training apparatus trains the discriminator 904 to generate an output corresponding to fake data. The training apparatus trains the decoder 903 and/or the encoder 901 based on a loss function, for example, a discrimination loss, defined for the decoder 903 to properly deceive the discriminator 904. In an example, the discrimination loss is defined, such that the discriminator 904 generates an output corresponding to real data in response to the training validation response of the decoder 903.

The training of the decoder 903 and/or the encoder 901 and the training of the discriminator 904 may be performed competitively, therefore the performance of network including the encoder 901 and the decoder 903 may improve.

Figure 10:
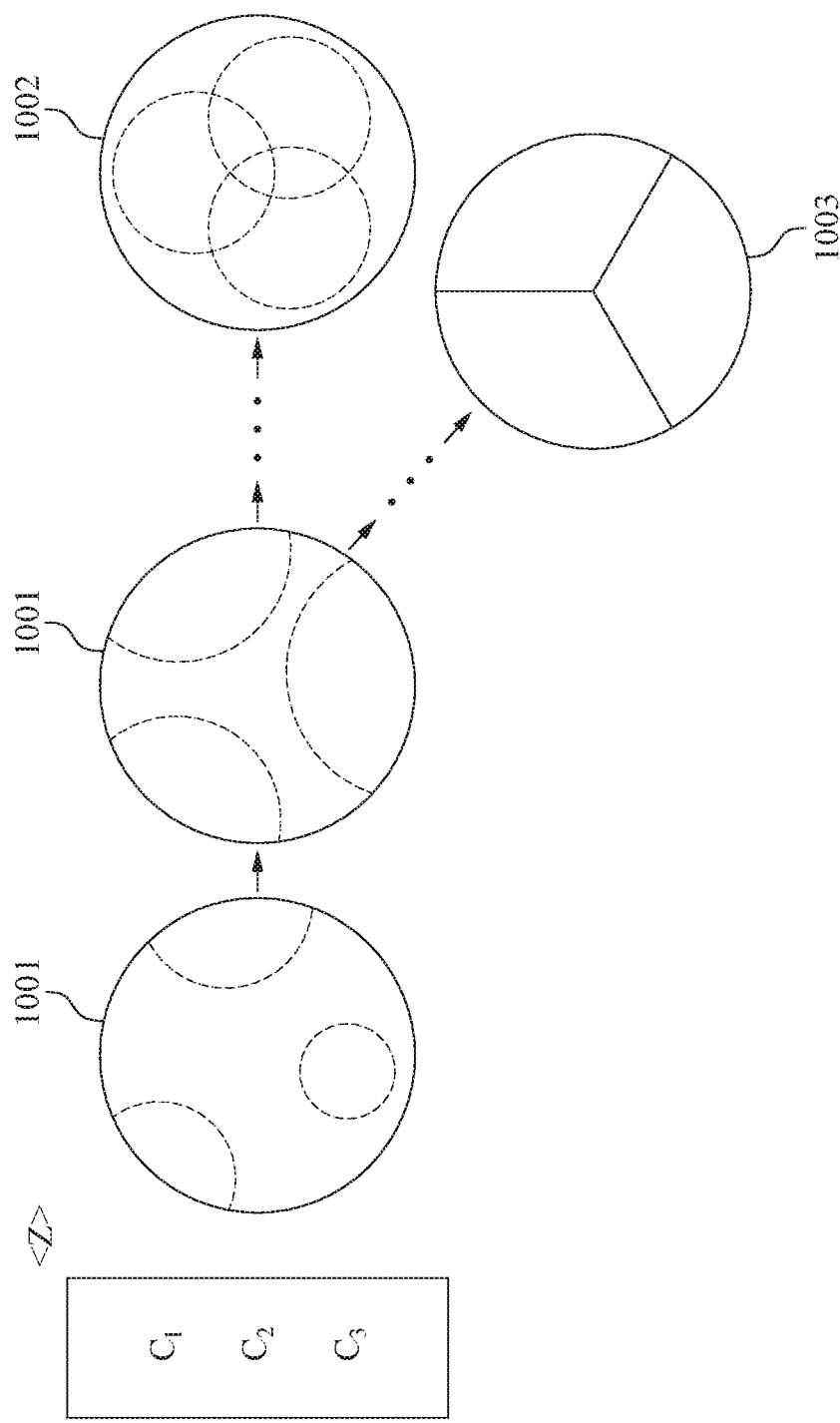
FIG. 10 illustrates an example of a training method for response inference, in accordance with one or more embodiments.

FIG. 10 illustrates an example of a training method for response inference in accordance with one or more embodiments.

Referring to FIG. 10, control inputs $c_1$, $c_2$, and $c_3$ corresponding to various responses in a latent variable region space 1001, are illustrated. The latent variable region space 1001 is implemented in the form 1003 partitioned by the control inputs $c_1$, $c_2$, and $c_3$. In this example, a training apparatus trains an encoder and a decoder based on the control inputs $c_1$, $c_2$, and $c_3$, a plurality of training inputs, training responses, and output responses, and the latent variable region space 1001 is partitioned into regions respectively corresponding to the control inputs $c_1$, $c_2$, and $c_3$ by the training process. For ease of description, an example in which the partitioned regions of the latent variable region space 1001 cover the entire latent variable region space 1001 is illustrated. Depending on the latent variable region space 1001, the partitioned regions cover only a portion of the latent variable region space 1001. If a vector not covered by the partitioned regions is obtained during the sampling process or the additional sampling process, it is determined that validation has failed.

In another example, the latent variable region space 1001 is implemented in the form 1002 including a plurality of regions, rather than being partitioned. Similarly, the plurality of regions covers only a portion of the latent variable region space 1001. If a vector not covered by the plurality of regions is obtained during the sampling process or the additional sampling process, it is determined that validation has failed.

Hereinafter, examples in which the latent variable region space 1001 is implemented in the partitioned form 1003 will be described.

In an example, the regions of the latent variable region space 1001 differ from each other to respectively correspond to the control inputs. A region of the latent variable region space 1001 indicated by a control input may not be known at a time when the control input is input.

Although not shown in the drawings, the latent variable region space 1001 may be softly partitioned. For example, regions of the latent variable region space 1001 may overlap each other, or there may be an empty region in the latent variable region space 1001. In this example, a latent variable vector may belong to an overlapping region of at least two regions or the empty region.

Although not shown in the drawings, a response inference engine configured to generate a response comprehensively considering results of training with respect to different user inputs may be generated.

TABLE 5

| User input | Control input | Output response |
|---|---|---|
| A | Feature vector generated based on a1 | a1 |
|  | Feature vector generated based on a2 | a2 |
|  | Feature vector generated based on a3 | a3 |
| A' | Feature vector generated based on b1 | b1 |
|  | Feature vector generated based on a2' | a2' |

In an example, referring to Table 5, output responses a1, a2, and a3 are used for training with respect to a user input A. Further, output responses b1 and a2' are used for training with respect to a user input A'.

The user input A and the user input A' are similar to each other. In this example, a first latent variable region space generated by the user input A and a second latent variable region space generated by the user input A' are similar to each other.

In addition, the output response a2 and the output response a2' are similar to each other. In this example, a first region selected by the feature vector of the output response a2 and a second region selected by the feature vector of the output response a2' are similar to each other.

The first region of the first latent variable region space and the second region of the second latent variable region space have similar distributions, and the other output responses a1, a3, and b1 are distributed in regions different from the first region and the second region.

As a result, the response inference engine trained as shown in Table 3 generates b1 as well as a1, a2, and a3 in response to the user input A during an inference process. Further, the response inference engine also generates a1 and a3 as well as b1 and a2' in response to the user input A'.

Figure 11:
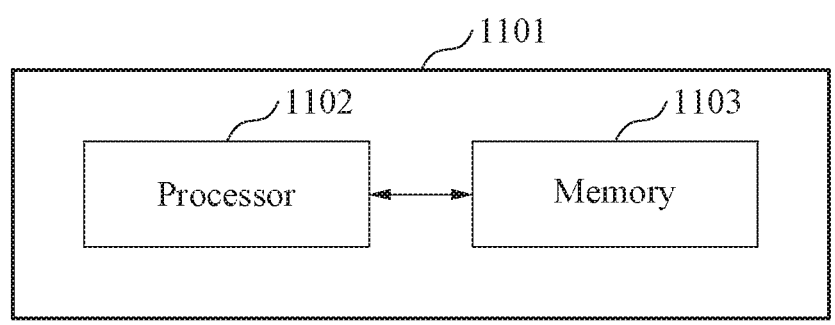
FIG. 11 illustrates an example of a configuration of a response inference apparatus, in accordance with one or more embodiments.

FIG. 11 illustrates an example of a configuration of a response inference apparatus, in accordance with one or more embodiments.

Referring to FIG. 11, a response inference apparatus 1101 includes a processor 1102 and a memory 1103. The response inference apparatus 1101 is the response inference apparatus or the training apparatus described above. The processor 1102 includes at least one of the apparatuses described above with reference to FIGS. 1 through 10 or performs at least one of the methods described above with reference to FIGS. 1 through 10. Further details of the processor 1102 are provided below. The memory 1103 stores information related to the response inference method or the training method described above or stores a program to implement the response inference method or the training method described above. The memory 1103 is a volatile memory or a non-volatile memory. Further details of the memory 1103 are provided below.

The processor 1102 executes the program and controls the response inference apparatus 1101. Program codes to be executed by the processor 1102 are stored in the memory 1103. The response inference apparatus 1101 is connected to an external device, for example, a personal computer or a network, through an input and output device (not shown) and exchange data with the external device.

The response inference apparatus, the training apparatus, the response inference apparatus 201, the encoder 401, the decoder 402, the encoder 501, the component 502, the decoder 503, the encoder 901, the sampler 902, the decoder 903, the response inference apparatus 1101 described herein with respect to FIGS. 1-11, and that perform operations described in this application, are implemented as, and by, by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented response inference method, comprising:
    receiving an input;
    generating a latent variable vector in a latent variable region space that includes regions corresponding to a plurality of responses by encoding the received input;
    generating a validation vector with a predetermined phase difference from the generated latent variable vector;

generating an output response corresponding to a region of the latent variable vector by decoding the latent variable vector;

generating a validation response corresponding to a region of the validation vector by decoding the validation vector;

validating the output response by comparing the output response to the validation response; and outputting the output response to the received input based on a result of the validating.

2. The method of claim 1, wherein the generating of the validation vector comprises generating the validation vector, such that the validation vector and the latent variable vector have a predetermined phase difference.

3. The method of claim 1, wherein the generating of the validation vector comprises generating the validation vector, such that the validation vector and the latent variable vector are in antiphase.

4. The method of claim 1, wherein the validation vector comprises a plurality of validation vectors, and
wherein the generating of the validation vector comprises generating the validation vector, such that the validation vector and the latent variable vector have predetermined phase differences.

5. The method of claim 1, wherein the latent variable vector is a multidimensional vector comprising latent information variables to generate a response to the received input.

6. The method of claim 1, wherein the generating of the latent variable vector comprises:
generating a latent variable by encoding the received input; and
generating the latent variable vector belonging to one of the regions included in the latent variable region space corresponding to the latent variable.

7. The method of claim 6, wherein the generating of the latent variable vector comprises:
sampling a plurality of vectors based on a probability distribution representing the latent variable region space; and
generating the latent variable vector based on the sampled vectors.

8. The method of claim 1, wherein the validating of the output response comprises:
scoring the output response;
scoring the validation response; and
comparing a score of the output response to a score of the validation response.

9. The method of claim 8, wherein the comparing comprises determining whether a difference between the score of the output response and the score of the validation response is greater than a predetermined value.

10. The method of claim 1, wherein the input is an utterance of a user not intended to get a specific response in a conversation, and
each of the plurality of responses are different responses to the utterance.

11. The method of claim 1, wherein the generating of the latent variable vector comprises encoding the received input with an encoder, and
wherein a neural network of the encoder comprises an input layer corresponding to the received input and an output layer corresponding to a mean and a variance of a probability distribution modeling the latent variable.

12. The method of claim 1, wherein the generating of the output response comprises decoding the latent variable vector with a decoder, and the generating of the validation response comprises decoding the validation vector with the decoder, and
wherein a neural network of the decoder comprises an input layer corresponding to the latent variable vector and an output layer corresponding to the output response.

13. The method of claim 1, wherein a neural network of the decoder comprises an input layer corresponding to the validation vector and an output layer corresponding to the validation response.

14. A non-transitory computer-readable storage medium storing instructions that, when executed by a processor, cause the processor to perform the response inference method of claim 1.

15. A processor-implemented training method comprising:
receiving a training input;
receiving a training response from among a plurality of training responses to the received training input;
generating a latent variable by applying the received training input to an encoder to be trained;
generating a training latent variable vector of a region included in a latent variable region space corresponding to the latent variable;
generating an output response by applying the training latent variable vector to a decoder to be trained; and
training a neural network of the encoder and a neural network of the decoder based on the output response and the training response to generate trained neural networks.

16. The method of claim 15, further comprising:
generating a training validation vector with a predetermined phase difference from the training latent variable vector;
generating a training validation response by applying the training validation vector to the decoder;
training a discriminator configured to operate to discriminate between the output response and the training validation response; and
training the neural network of the encoder and the neural network of the decoder, such that the discriminator is unable to discriminate between the output response and the training validation response.

17. The method of claim 15, wherein the training latent variable vector is a multidimensional vector comprising latent information variables to generate a response to the training input.

18. The method of claim 15, wherein the latent variable region space comprises a plurality of regions corresponding to the plurality of training responses.

19. The method of claim 15, wherein the generating of the training latent variable vector comprises:
sampling a plurality of vectors based on a probability distribution representing the latent variable region space;
generating an embedded control input by randomizing a control input;
applying the embedded control input to the sampled vectors; and
generating the training latent variable vector through a weighted sum of the sampled vectors to which the embedded control input is applied.

20. A response inference apparatus comprising:
a processor configured to:
receive an input;
generate a latent variable vector in a latent variable region space that includes regions corresponding to a plurality of responses by encoding the received input;
generate a validation vector with a predetermined phase difference from the generated latent variable vector;
generate an output response corresponding to a region of the latent variable vector by decoding the latent variable vector;
generate a validation response corresponding to a region of the validation vector by decoding the validation vector;
validate the output response by comparing the output response to the validation response; and
output the output response to the received input based on a result of the validating.

21. The apparatus of claim 20, further comprising a memory including instructions,
wherein, in response to the instructions being executed by the processor, the processor is controlled to perform the receiving of the input, the generating of the latent variable vector in the latent variable region space, the generating of the validation vector, the generating of the output response, the generating of the validation response, the validating of the output response, and the outputting of the output response.

22. A processor-implemented response inference method comprising:
receiving a user input;
generating a probability distribution with an encoder based on the received input;
sampling a plurality of vectors based on the generated probability distribution;
applying an embedded control input to each of the sampled vectors;
generating a latent variable vector from the probability distribution based on the control input; and
generating an output response corresponding to a region of the latent variable vector by decoding the latent variable vector.

23. The method of claim 22, wherein the control input is a vector of a same dimension as dimensions of the sampled vectors.

24. The method of claim 22, wherein the probability distribution is generated from a mean and a variance generated from the user input.

* * * * *